United States Patent
Zhu et al.

(10) Patent No.: US 7,617,187 B2
(45) Date of Patent: Nov. 10, 2009

(54) DATASET SEARCH USING REDUCED COLLATION SET

(75) Inventors: Yixue Zhu, Sammamish, WA (US); Jun Fang, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 250 days.

(21) Appl. No.: 11/050,094

(22) Filed: Feb. 3, 2005

(65) Prior Publication Data
US 2006/0173823 A1 Aug. 3, 2006

(51) Int. Cl.
G06F 7/00 (2006.01)
(52) U.S. Cl. .................................. 707/3; 707/5
(58) Field of Classification Search ............ 707/3, 707/4, 5
See application file for complete search history.

(56) References Cited

U.S. PATENT DOCUMENTS

| | | | | |
|---|---|---|---|---|
| 6,134,540 | A * | 10/2000 | Carey et al. | 707/2 |
| 6,374,253 | B1 * | 4/2002 | Weider et al. | 707/102 |
| 6,584,470 | B2 * | 6/2003 | Veale | 707/102 |
| 2005/0223022 | A1 * | 10/2005 | Weissman et al. | 707/102 |
| 2005/0251519 | A1 * | 11/2005 | Davis | 707/100 |
| 2006/0064432 | A1 * | 3/2006 | Pettovello | 707/103 X |

OTHER PUBLICATIONS

Unicode Technical Standard #10, Unicode Collation Algorithm, http://www.unicode.org/reports/tr10, Dec. 23, 2004, 66 pages.

* cited by examiner

*Primary Examiner*—Don Wong
*Assistant Examiner*—Belinda Xue
(74) *Attorney, Agent, or Firm*—Woodcock Washburn LLP

(57) ABSTRACT

A method of searching for objects in a second database using a query from a first database includes receiving a first query from the first database where the first query is generated using a collation associated with the first database or user session or explicitly specified by users, where the first database may be the same as the second database. The first query is rewritten to form a second query which includes a superset of the collation and a residue predicate which includes a predicate from the first query. An index plan is adopted which targets an index associated with the a multiple language collation expressed in the rewritten query. The rewritten query is executed accessing the index and corresponding data that align with the residue predicate. The total number of indexes provided can be much less than the number of indexes needed if all possible collations were individually indexed.

14 Claims, 3 Drawing Sheets

DATASET SEARCH USING REDUCED COLLATION SET

FIELD OF THE INVENTION

This invention relates in general to the field of database management. More particularly, this invention relates to database management in a simplified spoke and hub architecture.

BACKGROUND OF THE INVENTION

Collation is the general term for the process and function of determining the sorting order of strings of characters. It is a key function in computer systems. Users of collations use them to more easily and reliably find individual character strings. Thus it is widely used in user interfaces and in searches. It is also crucial for the operation of databases, not only in sorting records but also in selecting sets of records with fields within given bounds in a search.

Collation is not uniform; it varies according to language and culture. Germans, French and Swedes sort the same characters differently. It may also vary by specific application: even within the same language, dictionaries may sort differently than phonebooks or book indices. For non-alphabetic scripts such as East Asian ideographs, collation can be either phonetic or based on the appearance of the character. Collation can also be commonly customized or configured according to user preference, such as ignoring punctuation or not, putting uppercase before lowercase or vice versa. Linguistically correct searching also needs to use the same mechanisms. For example, just as "v" and "w" sort as if they were the same base letter in Swedish, a loose search should pick up words which use either one of the letters.

Thus collation implementations deal with the often-complex linguistic conventions that communities of people have developed over the centuries for ordering text in their language, and provide for common customizations based on user preferences. And while doing all of this, of course, performance is critical in terms of search time and storage. Binary sorts, for example using B-Trees, depend on the value ascribed to a character. Binary sorts use the $<, \leqq, >, \geqq,$ and $=$ operators to choose between different branches on the B-Tree. Some languages set different values for characters. For example, in Swedish, z<Ö, but in German, Ö<z. Other differences involve the use of case sensitive (CS) or case insensitive (CI) words, accent sensitive (AS) or accent insensitive (AI) words, width sensitive or width insensitive, and kana sensitive or insensitive words.

The conventions that people have developed over the centuries for collating text in their language are often quite complex. Languages vary not only regarding which types of sorts to use and in which order they are to be applied, but also in what constitutes a fundamental element for sorting. For example, Swedish treats ä as an individual letter, sorting it after z in the alphabet; German, however, sorts it either like ae or like other accented forms of a, thus following a in value. In Slovak, the digraph ch sorts as if it were a separate letter after c. Examples from other languages and scripts abound.

Databases use collation rules to search for terms within their databases. It can readily be seen that a search for a given word or term in a database using one collation will yield different results if the same search were conducted using a different collation. This is purposeful and expected as the collation rules are as distinct as the human language used. A collation rules set used in one language is tailored to that language to yield a language-specific result for its respective database. But, as indicated above, there are many collations for a single language. For example, a single language may have sensitivities according to character case, character width, accent use, and kana. There are 16 permutations of the different collations for a single language using the four sensitivities. Assuming there are 50 different languages, then there are 800 different possible collations.

FIG. 1 depicts a server 10, such as Microsoft's Structured Query Language Server (SQL Server™) available from Microsoft® in Redmond, Wash. The server 10 contains a centralized system resource available to provide data, methods, and services to databases 30, 40 and 50. Each database, 30, 40, 50, can each search the system resource database 20 using a database query. Each database may support a different human language and therefore may have the 16 collations associated with that specific language. For example, database 1 (30) may be a Japanese language database having sensitivities relating to case, width, accent and kana and thus have 16 different permutations of collations containing the sensitivities.

A query initiated in database 1 (30) may be queried against the system resource database 20. The system resource database is required to be capable of accommodating 50 human language collations sets, each set having up to 16 different permutations. Accordingly, the system resource database should reasonably be expected to have capability of 800 collation rules. Given that up to 800 different search rule sets may be applicable, the system resource database 20 may be forced to be large to accommodate the rule sets. Searching up to 16 rules sets per language can also slow down the return of query results to a supported database 30, 40 and 50.

Thus, there is a need for a method and system that support searches between databases and that can accommodate different human languages in a time and space efficient manner. The present invention addresses the aforementioned needs and solves them with additional advantages as expressed herein.

SUMMARY OF THE INVENTION

Aspects of the invention include a method for searching for objects in a system resource database from a user database. A typical environment is the SQL Server™ environment where a separate read only resource database is available for users of other databases within the SQL Server to access generally useful objects, methods and system views for fast upgrade and deployment. The user database can have different collation settings than the system resource database. The SQL Server™ environment can resolve object names in the user database collation. Since system objects logically exist in every database, they can be resolved using the collation of the current user database. More specifically, system objects physically exist in resource database, their metadata is stored in one table in the resource database and the name, a simple ASCII character set, is in one of the table columns, which has an example collation of Latin1_General_CI_AI. Given that the SQL Server™ environment supports thousands of collations, and is frequently asked to look up an object by name, it is not feasible to use table scan due to performance. Neither is it feasible to create indexes on object names for every collation due to storage size.

One aspect of the present invention is to use a reduced set of collation definitions within a single language and to rewrite a user query to use that reduced set. In another aspect of the invention, a reduced set of indexed computed columns is used to support multiple language collations and only those predefined indexes are used as search tools for user queries against the system resource database. This design can also support dynamic collation setting per session instead of per database, or queries against user tables or views in current database using collation specified parameter. The present invention can be applied to user tables or views which required search by multiple collations. The queries can be against tables or views in a local database or in another database. Thus, queries may be made against different datasets.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary Embodiments of the Invention

Figure 1:
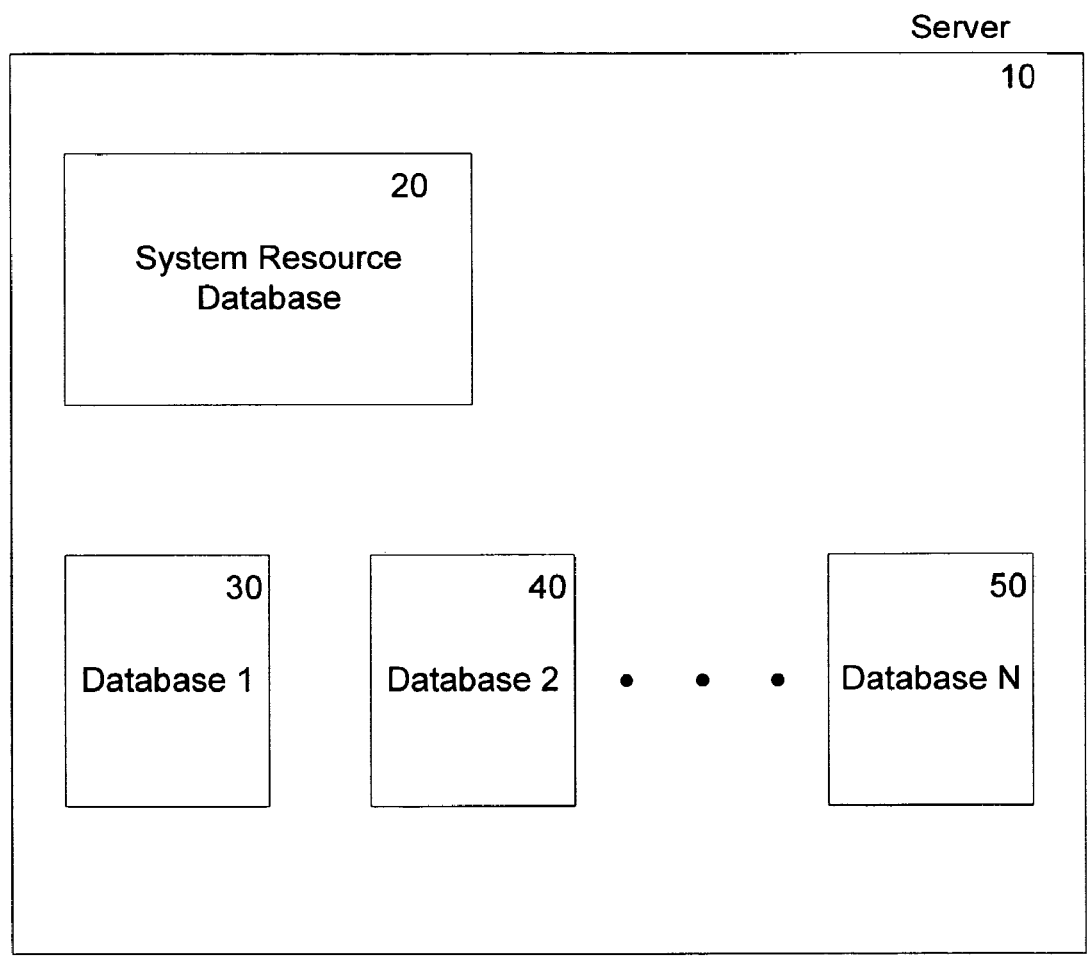
FIG. 1 is a block diagram of a system involving aspects of the invention.

One method to increase the speed of producing query results is to search the target database using an index on the database. Indexes are directory listings maintained by the database management system. An index of files contains at least one entry for each file name and the location of the file. An index of records may have an entry for each key field, such as the name and content fields as well as the location of the record. In the specific context of the multiple language collation search problem, an index on the database would be useful to speed the query process. An index is always built on one collation, and typically can only be used when the comparison or seek is to be performed in the same collation. However, as described above, the number of indexes in the present context can approach 800 in number. Such a large number of indexes may be generally used because each query in each collation is performed in the context of a single database having up to 16 different collations per each of the 50 languages. However, this total number of collation indexes can be reduced according to aspects of the invention.

For any language, SQL Server™ supports a set of collations with different sensitivity combinations. For example, Latin1_General_CI_AS and Latin1_General_CI_AI use the same language, but one is accent or diacritics sensitive, the other is accent insensitive. Both of them are case insensitive. It may be observed that for searches in language collations;
(1) <string1> collate Latin1_General_CI_AS=<string2> collate Latin1_General_CI_AS implies <string1> collate Latin1_General_CI_AS=<string2> collate Latin1_General_CI_AI
(2) <string1> collate Latin1_General_CI_AS < <string2> collate Latin1_General_CI_AS implies <string1> collate Latin1_General_CI_AI ≦ <string2> collate Latin1_General_CI_AI
(3) <string1> collate Latin1_General_CI_AS > <string2> collate Latin1_General_CI_AS implies <string1> collate Latin1_General_CI_AI ≧ <string2> collate Latin1_General_CI_AI This applies to any two strings, or any language. It also applies to other sensitivity flags such as case sensitivity, width sensitivity and kana sensitivity. Therefore, if one builds an index on "column collate Latin1_General_CI_AI", for a user query:
Column collate Latin1_General_CI_AS=<expression>

Then, one can safely transform the query expression to:
Column collate Latin1_General_CI_AI=<expression> collate Latin1_General_CI_AI AND Column collate Latin1_General_CI_AS=<expression>

The first part of the filter Column collate Latin1_General_CI_AI = <expression> collate Latin1_General_CI_AI enables performance of an index seek to limit the search range to only a few rows, and the residual predicate will make sure all the results satisfy the original condition given by the user.

With this optimization, for each language, a single index on the everything-insensitive collation suffices for the query. The reduced collation supports an index seek on any sensitivity flag combination on this language. As a practical matter, the system resource database of FIG. 1 uses Unicode character definitions. A special case of the reduced collation set is that all binary collations can be mapped to one collation, Latin1_General_BIN, because different binary collations only make a difference for non-Unicode data, whereas all strings in the system resource database are Unicode.

Thus, one simplification may be obtained by observing that some collations can roughly be considered supersets of other collations. For example, the collation of Latin1_General_CS_AI (Latin, case sensitive, accent insensitive) is a subset of Latin1_General_CI_AI (Latin, case insensitive, accent insensitive). If an index is built for case insensitive, then the index includes the case sensitive index as well. Thus a storage size savings may be achieved by using a single index instead of two separate indexes. Overall, the preferred use of insensitive collations is helpful to reduce the total number of indexes needed. This has the effect of reducing the 16 permutations of the collations of any language to just one or two collations with unique languages.

As a second example, consider a database, such as database 1 of FIG. 1, item 30, to generate a query as follows:
select * from system.obj (in a system resource db) where name="foo" collate French_CS_AI.

The above query can be rewritten to:
select * from system.obj where name collate="foo" collate French_CI_AI and append the residual predicate of the original query as:
name="foo" French_CS_AI.

Using this scheme, only the French_CI_AI index need be built and not the additional French_CS_AI index. The French_CI_AI index may be used and the search continues with the collation for French_CS_AI.

A second optimization may be made using aspects of the present invention to reduce the total number of language collations that need be indexed. It is observed that the names of objects that SQL Server™ provides in a system resource database contains only basic ASCII characters. This makes the object names readable in ASCII to users of many languages. A second observation reveals that the basic ASCII characters are sorted identically in many different languages. Typically, different languages differ only in some international characters. For example, the Chinese language has special handling for Chinese characters. For ASCII characters, the Chinese language sorts identically to Latin1_General. Consequently, the index B-Tree that is built for a collation of Chinese_PRC_CI_AI would be identical to the collation built for Latin1_General_CI_AI so that the names of objects in a system resource database could be read. Therefore, we can use the same B-Tree to search data in different collations.

With this second optimization, indexes need only be built on collations that have some difference in sorting ASCII characters. This further maps collations in the above first optimization to only a dozen or so collations. The resulting collations are as follows: Latin 1_General, covers all locales except those listed below.

Japanese
Korean
Croatian
Czech
Danish, also covers Norwegian
Finnish, also covers Swedish
Hungarian
Hungarian_Technical
Spanish, covers both Spanish(Tradition) and Spanish (Mexico)
Slovak
Turkish
Vietnamese An example of collation transformation follows:

for ease of nomenclature, one can define "all_objects" to represent the catalog view that exposes system objects, name *, as the column that exposes system object names. Also the system object resource database, sysobjrdb, defines the underlying table.

EXAMPLE I

A Case/Accent Sensitive Collation Transformed to Case/Accent Insensitive Collation Select * from sys.all_objects where name='foo' collate French_CS_AS Rewritten, the query becomes Select * from sys.sysobjrdb where name00f00b='foo' collate French_CI_AI and name00f008 collate French_CS_AS='foo' French_CS_AS The first predicate can use an index on a computed column name00f00b and the residue predicate "name00f008 collate French_CS_AS='foo'French_CS_AS" can enforce correct collation semantics according to the user request.

EXAMPLE II

A Case/Accent Sensitive Collation Transformed to Case/Accent Insensitive Collation Select * from sys.all_objects where name > 'foo' collate French_CS_AS Rewritten, the query becomes Select * from sys.sysobjrdb where name00f00b >='foo' collate French_CI_AI and name00f008 collate French_CS_AS > 'foo' French_CS_AS The first predicate can use an index on a computed column name00f00b and the residue predicate "name00f008 collate French_CS_AS > 'foo' French_CS_AS" can enforce the correct collation semantics according to the user request.

EXAMPLE III

A Collation Parameterized B-tree Seek

Select * from sys.all_objects where name='foo' collate Chinese_PRC_CS_AS

Rewritten, the query becomes

Select * from sys.sysobjrdb where name00f008='foo' collate Latin1_General_CI_AI and name00f008 collate Chinese_PRC_CS_AS='foo' Chinese_PRC_CS_AS The first predicate can use an index seek on name00f008 using collation Latin1_General_CI_AI and the residue predicate "name00f008 collate Chinese_PRC_CS_AS='foo' Chinese_PRC_CS_AS" can enforce the correct collation semantics according to the user request.

Figure 2:
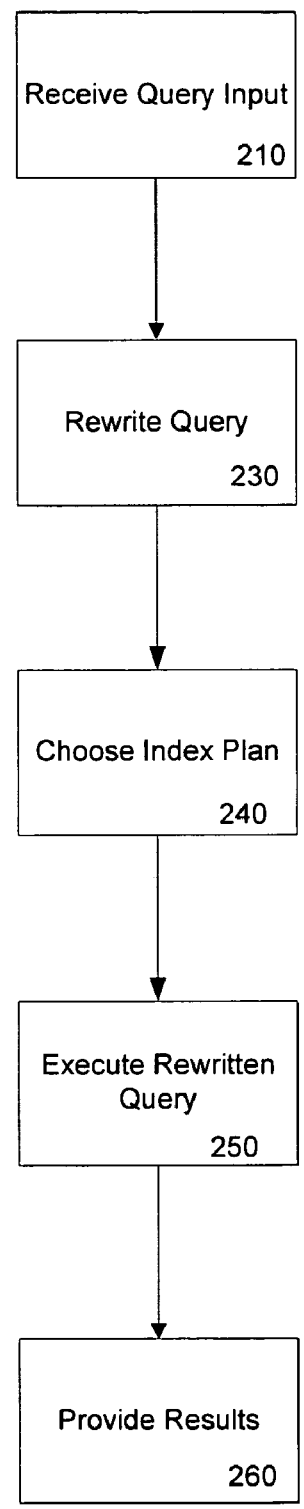
FIG. 2 is a flow diagram of an embodiment of the method of the invention.

FIG. 2 depicts a flow diagram 200 of a method incorporating aspects of the invention. Although FIG. 2 is an example of a method of querying between two databases, one of skill in the art can appreciate that the database may represent a dataset and that querying between datasets is inclusive of queries between databases, tables and views within the same database or between different databases. Initially, a query is received (step 210) by a user operating with a database having a collation. In general, the first query may be associated with a first collation associated with a first dataset, a first collation associated with a user session, or a first collation associated with an explicit user query. An example of an explicit user query would be:

name="foo" collate Latin1_CI_AS.

In the example method of FIG. 2, the received query is between different databases. As an example, the user could be querying from a user database in a SQL Server™ environment that includes multiple language collations. The user may be querying a system resource database accessible to the SQL Server™ users. The query received was generated using one language collation and the system resource database may be of another language collation.

The received query is rewritten (step 230) to use a collation that is, in general, a superset of the initial query collation. The rewritten query includes two parts. The first part is an expression of the user's query using a collation that is a superset of the user's collation. The second part of the query is a residue predicate that contains the user's original search term and collation. The superset collation has an associated index for the superset collation. The superset is used in part to reduce the possible collations in a single language from 16 to 1. The sixteen permutations result from permutations of the variabled of word case, accent use, character width and kana. In one embodiment of the invention, an algebrizer rewrites the query.

The rewritten query may start to be evaluated by a query plan (step 240). A query optimizer can choose a plan that uses a preferably pre-built index of a subset of the language collations. The subset of language collations being those language collations that have unique ASCII representations that are common to a number of different languages. This is analogous to the second optimization as discussed herein above. Once the index plan is determined, the query may be executed (step 250). In one embodiment, the query is executed within a SQL Server™ environment wherein the storage engine B-Tree manager uses the index supplied by the specified collation to find relevant database entries. The query further uses the residue predicate, having the user query collation, to provide results (step 260) to the user concerning his query. Results may be provided by a suitable display connected to the database system.

Exemplary Computing Device

Figure 3:
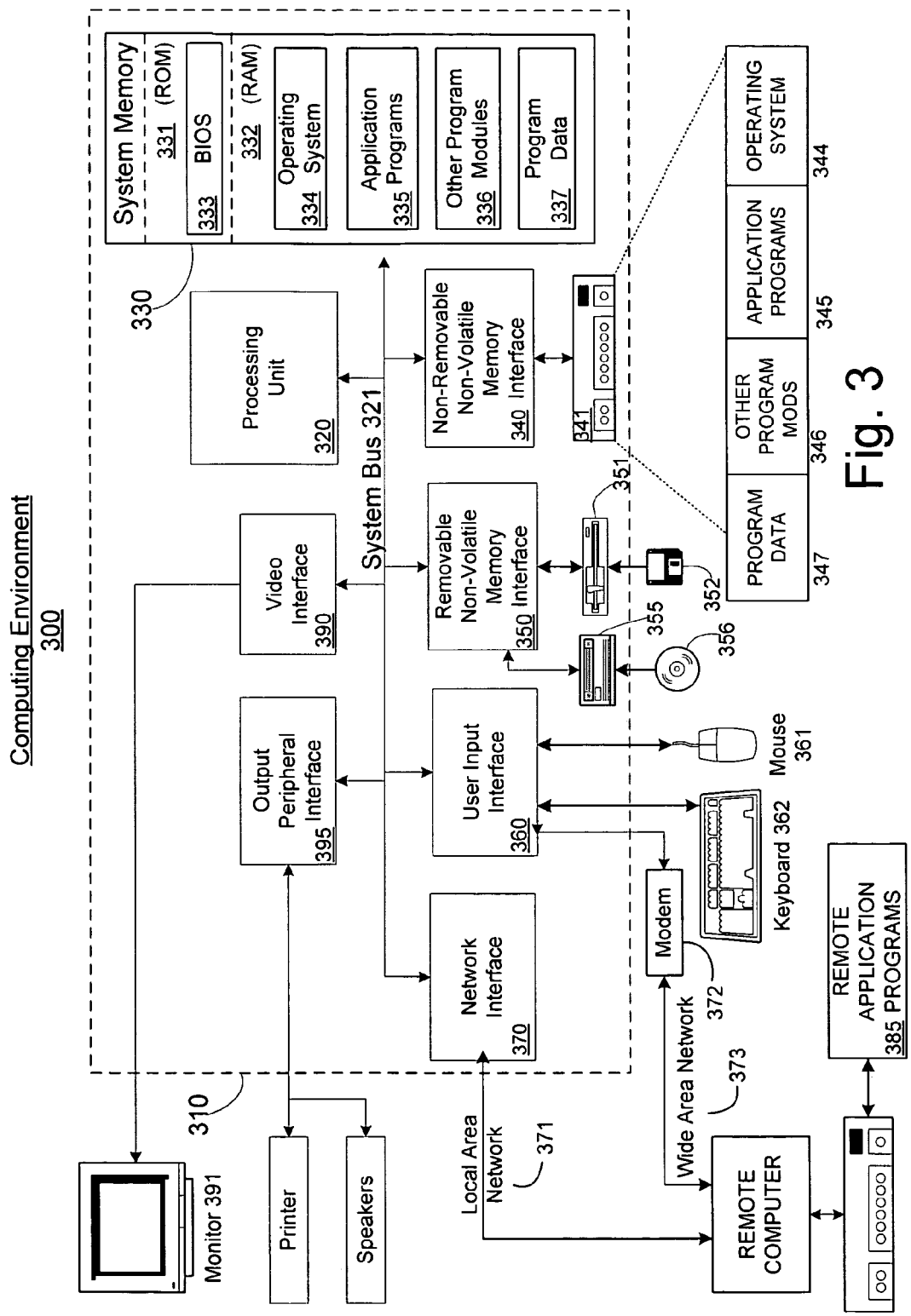
FIG. 3 is a block diagram showing an exemplary computing environment in which aspects of the invention may be implemented.

FIG. 3 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 3 thus illustrates an example of a suitable computing system environment 300 in which the embodiments of the invention may be implemented, although as made clear above, the computing system environment 300 is only one example of a suitable computing environment and is not intended to suggest any limitation as to the scope of use or functionality of an embodiment of the invention. Neither should the computing environment 300 be interpreted as having any dependency or requirement relating to any one or combination of components illustrated in the exemplary operating environment 300.

With reference to FIG. 3, an exemplary system for implementing an embodiment of the invention includes a general purpose computing device in the form of a computer system 310. Components of computer system 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 310 typically includes a variety of computer readable media. Computer readable media can be any available media that can be accessed by computer system 310 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 310.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer system 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer system 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3 provide storage of computer readable instructions, data structures, program modules and other data for the computer system 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer system 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390, which may in turn communicate with video memory (not shown). In addition to monitor 391, computer systems may also include other peripheral output devices such as speakers 397 and printer 396, which may be connected through an output peripheral interface 395.

The computer system 310 may operate in a networked or distributed environment using logical connections to one or more remote computers, such as a remote computer 380. The remote computer 380 may be a personal computer, a server, a router, a network PC, a peer device or other common network node, and typically includes many or all of the elements described above relative to the computer system 310, although only a memory storage device 381 has been illustrated in FIG. 3. The logical connections depicted in FIG. 3 include a local area network (LAN) 371 and a wide area network (WAN) 373, but may also include other networks/buses. Such networking environments are commonplace in homes, offices, enterprise-wide computer networks, intranets and the Internet.

When used in a LAN networking environment, the computer system 310 is connected to the LAN 371 through a network interface or adapter 370. When used in a WAN networking environment, the computer system 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer system 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a fast and storage efficient multiple collation environment. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of searching in a second dataset using a query from a first dataset, the method comprising:
receiving a first query using the first dataset, the first query being generated using a first collation associated with the first dataset, the first collation having a case sensitivity flag, an accent use sensitivity flag, a character width sensitivity flag, and a kana sensitivity flag for a first human language;
rewriting the first query to form a second query, the second query comprising a second collation and a residue predicate, the second collation comprising a superset of the first collation, the second collation of the second query being broader than the first collation of the first query and being insensitive with respect to at least one of case, accent use, character width, and kana, the second collation encompassing the first collation, the second collation having an associated index for the second collation, and the residue predicate comprising an original search term from the first query, wherein the residue predicate is selected to ensure that a set of results returned in response to the second query satisfies the case sensitivity flag, the accent use sensitivity flag, the character width sensitivity flag, and the kana sensitivity flag of the first collation;
optimizing the second query by choosing an index plan that targets an index associated with multiple human languages that is useful in searching across a multiplicity of human language collations;
executing the second query to search the first dataset; and
returning information satisfying the first query;
wherein the first and second datasets each comprise one of a database, a user session and an explicit user query.

2. The method of claim 1, wherein receiving the first query comprises receiving a query formed to search the first dataset according to a collation rule associated with the first human language.

3. The method of claim 1, wherein rewriting the first query to form the second query comprises rewriting the first query formed with a single human language collation such that the second query is formed to search with a broader human language collation than the first query, and wherein the residue predicate comprises elements of the first query.

4. The method of claim 1, wherein the index that is useful in searching across a multiplicity of human language collations is an index containing Unicode characters.

5. The method of claim 1, wherein executing the second query to search the first dataset comprises executing the second query to search for system objects in a system resource database.

6. A system for searching a second dataset from a first dataset, the system comprising:
a first dataset operating with a first collation, the first collation having a case sensitivity flag, an accent use sensitivity flag, a character width sensitivity flag, and a kana sensitivity flag for a first human language;
a second dataset operating with a second collation different from the first collation;
receiving means that accepts a first query from the first dataset against the second dataset;
an algebrizer that rewrites the first query into a second query;
an optimizer that chooses an index plan for the second query;
a query execution unit that executes the second query;
a processor, having access to memory for retrieving instructions, the instructions, when executed by the processor, causing the processor to perform acts comprising:
receiving a first query from the first dataset, the first query being generated using the first collation associated with the first dataset, the first collation having the case sensitivity flag, the accent use sensitivity flag, the character width sensitivity flag, and the kana sensitivity flag for the first human language;
rewriting the first query to form a second query, the second query comprising a second collation and a residue predicate, the second collation comprising a superset of the first collation, the second collation of the second query being broader than the first collation of the first query and being insensitive with respect to at least one of case, accent use, character width, and kana, the second collation encompassing the first collation, the second collation having an associated index for the second collation, and the residue predicate comprising an original search term from the first query including the first collation, wherein the residue predicate is selected to ensure that a set of results returned in response to the second query satisfies the case sensitivity flag, the accent use sensitivity flag, the character width sensitivity flag, and the kana sensitivity flag of the first collation;
optimizing the second query by choosing an index plan that targets an index associated with multiple human languages that is useful in searching across a multiplicity of human language collations;
executing the second query to search the first dataset; and
returning information satisfying the first query;
wherein the first and second datasets each comprise one of a database, a user session and an explicit user query.

7. The system of claim 6, wherein the first dataset comprises a user dataset operating with the first language.

8. The system of claim 6, wherein the second dataset comprises a system resource database in a SQL database management system.

9. The system of claim 6, wherein the method step of rewriting the first query comprises rewriting the first query such that the second query is formed to search with a broader human language collation than the first query, and wherein the residue predicate comprises elements of the first query.

10. The system of claim 6, wherein the method step of executing the second query to search the first dataset comprises executing the second query to search for system objects in a system resource database of a SQL database management system.

11. A computer-readable storage medium having computer-executable instructions that, when executed on a computer, cause the computer to perform a method for searching a second dataset from a first dataset, the method comprising:
receiving a first query from the first dataset, the first query being generated using a first collation associated with the first dataset, the first collation having a case sensitivity flag, an accent use sensitivity flag, a character width sensitivity flag, and a kana sensitivity flag for a first human language;
rewriting the first query to form a second query, the second query comprising a second collation and a residue predicate, the second collation comprising a superset of the first collation, the second collation of the second query being broader than the first collation of the first query and being insensitive with respect to at least one of case, accent use, character width, and kana, the second collation encompassing the first collation, the second collation having an associated index for the second collation, and the residue predicate comprising an original search term from the first query, wherein the residue predicate is selected to ensure that a set of results returned in response to the second query satisfies the case sensitivity flag, the accent use sensitivity flag, the character width sensitivity flag, and the kana sensitivity flag of the first collation;

optimizing the second query by choosing an index plan that targets an index associated with multiple human languages that is useful in searching across a multiplicity of human language collations;

executing the second query to search the first dataset; and returning information satisfying the first query;

wherein the first and second datasets each comprise one of a database, a user session and an explicit user query.

12. The computer-readable storage medium of claim 11, wherein the step of receiving a first query comprises receiving a query formed to search the first dataset according to a collation rule associated with the first human language.

13. The computer-readable storage medium of claim 11, wherein the step of rewriting the first query comprises rewriting the first query such that the second query is formed to search with a broader human language collation than the first query, and wherein the residue predicate comprises elements of the first query.

14. The computer-readable storage medium of claim 11, wherein the step of executing the second query to search the first dataset comprises executing the second query to search for system objects in a system resource database.

* * * * *